United States Patent [19]
Cobb et al.

[11] Patent Number: 4,783,655

[45] Date of Patent: Nov. 8, 1988

[54] ARTICLE MONITORING SYSTEM WITH PRINTING CAPABILITY

[75] Inventors: Richard G. Cobb, 605 S. First, Apt #1, Norfolk, Nebr. 68701; S. Keith Chesterton, Norfolk, Nebr.

[73] Assignee: Richard G. Cobb, Norfolk, Nebr.

[21] Appl. No.: 842,794

[22] Filed: Mar. 24, 1986

Related U.S. Application Data

[63] Continuation-in-part of Ser. No. 680,081, Dec. 10, 1984, Pat. No. 4,595,922.

[51] Int. Cl.⁴ .................... G06F 7/04; G08B 5/22
[52] U.S. Cl. ................... 340/825.49; 340/825.31; 340/825.35
[58] Field of Search ............ 340/825.49, 825.11, 340/825.35, 825.31, 825.06, 825.55

[56] References Cited

U.S. PATENT DOCUMENTS

| | | | |
|---|---|---|---|
| 2,971,806 | 2/1961 | Andreason | 340/825.49 |
| 3,573,739 | 4/1971 | Zeitlin | 340/825.49 |
| 4,595,922 | 6/1986 | Cobb et al. | 340/825.49 |
| 4,635,053 | 1/1987 | Banks et al. | 340/825.35 |

Primary Examiner—Donald J. Yusko
Attorney, Agent, or Firm—Kokjer, Kircher, Bradley, Wharton, Bowman & Johnson

[57] ABSTRACT

A system for storing and electronically monitoring the locations of keys and other articles, and providing a printed record of transactions involving the stored articles. The articles are held on digitally coded article holders which are stored on a storage panel and electronically scanned to determine the identity of the article at each storage location on the panel. When an authorized user of the system enters his user code and makes a request for one of the articles, an indication light is energized to indicate the location of the requested article. If the article is absent, the system displays the user code of the authorized user in possession of the missing article. A printer in the system operates to provide a printed record of which users removed and returned which articles at which times. An optional scale weighs articles such as pharmaceuticals to determine the weight of the contents that are removed.

4 Claims, 6 Drawing Sheets

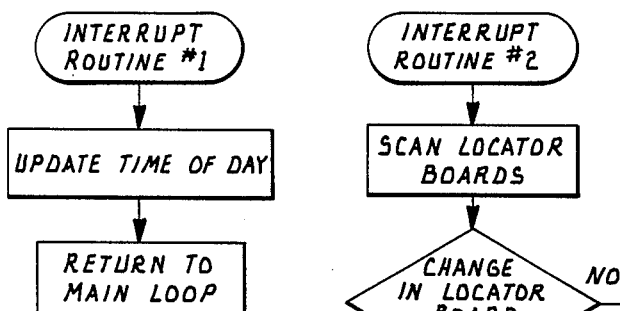
Fig. 10.
Fig. 11.
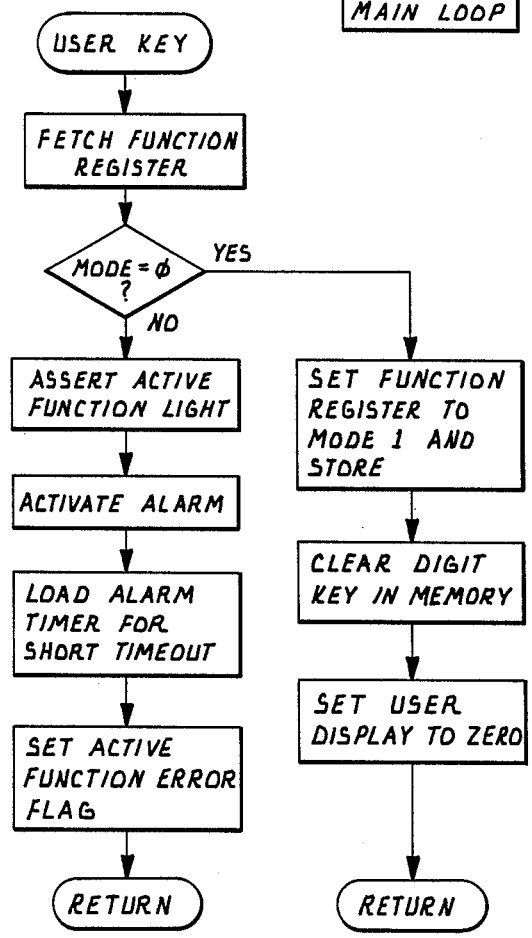
Fig. 13.
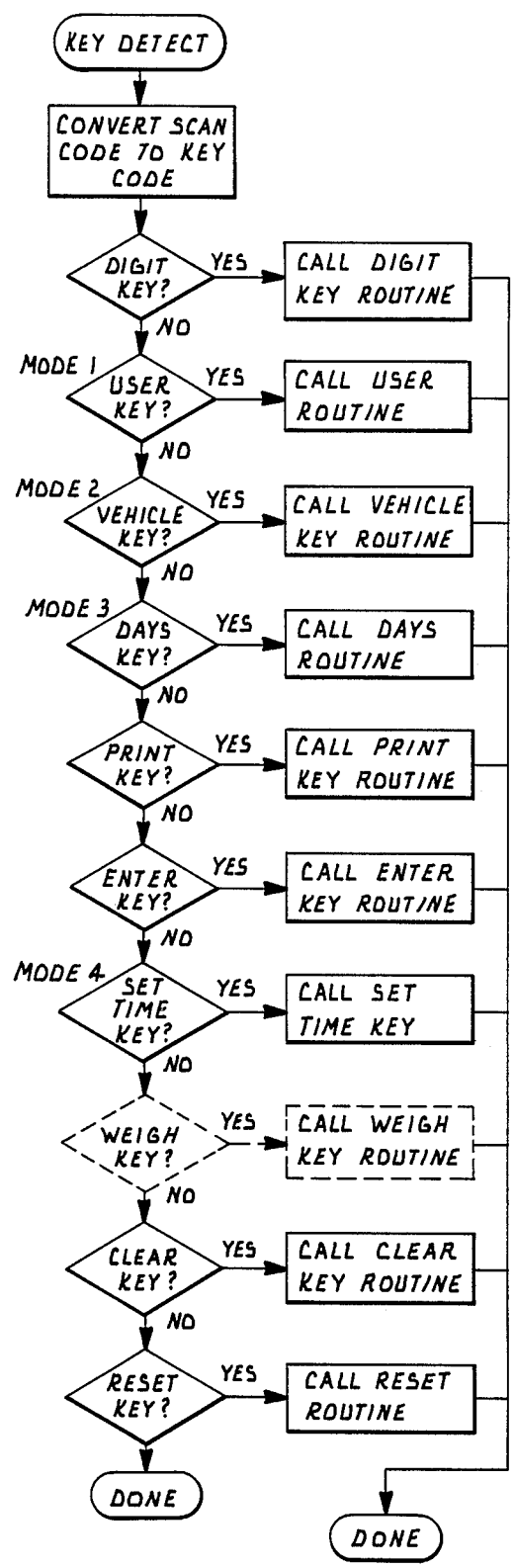
Fig. 12.

ARTICLE MONITORING SYSTEM WITH PRINTING CAPABILITY

BACKGROUND OF THE INVENTION

This application is a continuation in part of our pending application; Ser. No. 680,081, filed Dec. 10, 1984 and entitled "Method and Apparatus for Monitoring Keys and Other Articles", now U.S. Pat. No. 4,595,922.

This invention relates generally to the monitoring of articles such as the keys for the automobiles in the inventory of automobile dealerships. More particularly, the invention is directed to a system which allows authorized users to easily locate keys and similar articles.

It is not uncommon for automobile dealerships to have a large number of both new and used vehicles in stock. Consequently, the dealer is confronted with the difficult problem of keeping track of a large number of keys which must be available to the salesmen, service manager, "lot man" and other authorized personnel. Typically, the keys are hung on a key board when not in use. Each peg on the board is assigned to a particular key which is to be hung on the peg when the salesman or other user who has borrowed it no longer requires use of the key. Another common procedure is to assign a table, drawer or other area for storage of the keys, and the keys that are not in use are simply placed randomly in the storage area.

Both of these systems are unsatisfactory. Salesman and others often fail to return the keys when they are finished with them, and it is difficult for others to locate missing keys because no record is normally kept to identify who has each key. Attempts to provide systems where keys are checked in and checked out by identified personnel have been no more successful, primarily because of failure to follow the proper procedure. In the case of hangboards, even keys which have been returned are sometimes difficult to locate because they are inevitably hung on the incorrect peg from time to time. In the case of surface or drawer storage, it is usually necessary to sort through a large number of keys in order to locate the key that is desired or to determine that it is missing.

In addition to the problem of physically keeping track of the keys, automobile dealerships can obtain valuable management information if they are able to determine which personnel are in possession of which keys at what times. For example, if some sales personnel are not obtaining keys, they are not showing vehicles to customers or giving demonstration rides. Conversely, sales persons who access large numbers of different keys are showing large numbers of vehicles to customers. Models which particular sales people or all sales people are overlooking or are demonstrating frequently can be determined if a record is kept of the removal and return of keys. Vehicles which are damaged or taken to lunch or used to perform personal errands by sales personnel could also be made known to the dealership management. Information as to who has what keys at what times is thus potentially valuable information for management purposes to determine which models and colors to stock and which sales persons are working hardest.

Similar problems are encountered in keeping track of keys in other businesses such as the operation of parking lots, office buildings, apartment buildings, real estate companies, and rental car companies. Monitoring the locations of articles other than keys can also present significant difficulty, especially when there are a large number of articles that differ little in appearance. For example, in pharmacies and other businesses which handle drugs and medicines, it is difficult to keep close track of inventory and to determine who is removing what products in what quantities.

SUMMARY OF THE INVENTION

The present invention is directed to a system for storing and monitoring keys and other articles and is directed particularly to a system having the capability of providing a printed record containing information as to which articles have been checked out by which authorized persons, and the date and time each article was removed and returned. Another important aspect of the invention is the provision of a scale which serves to provide a determination as to how much of a particular pharmaceutical or other product is removed by persons having access to it.

In accordance with the invention, keys or other articles are held on a storage panel and may be removed by authorized personnel only after a valid user code has first been entered. The location of each article requested is indicated by an indicator light, and each article can be returned to the storage panel at any randomly selected storage loation which is vacant. The system is polled or scanned repeatedly to determine the identity of the article present at each storage location, and the system enters into memory the user code that has been entered prior to removal of an article. The date and time of removal is also monitored, as is the date and time each article is returned to the storage panel.

An optional weighing scale determines the weight of each article at its removal and as it is returned. Consequently, in the case of drugs and medications, the amount of product removed is determined and stored in memory with the user code of the authorized user who removed the product. This provides close monitoring of the drug inventory and allows management to determine which drugs are removed by which persons in order to match the quantities actually removed with the records of sales.

The provision of a printer in the system is an important feature of the invention. The printer operates to provide a "hard" written record of which articles have been removed and returned by which persons. In one mode of operation, the printer prints a record of the dates and times of removal and return of all articles removed over a 30 day period by any particular user of the system. This provides management with information regarding the sales activity of each sales person and enables management to evaluate the sales personnel of the business. In another mode of operation, the printer prints a record of when and by whom a particular article was removed during a 30 day period. In the case of an automobile dealership, this provides information as to which models are being demonstrated frequently (or improperly used frequently), and which models are being overlooked by salesmen (or are unpopular with customers). Other computational devices can be used.

DESCRIPTION OF THE DRAWINGS

In the accompanying drawings which form a part of the specification and are to be read in conjunction therewith and in which like reference numerals are used to indicate like parts in the various views:

FIG. 10 is a flow diagram for the software routine which updates the time of day;

FIG. 11 is a flow diagram for the software routine which controls scanning of the locator boards in the system;

FIG. 12 is a flow diagram for the software routine used when one of the keys on the keyboard is depressed;

FIG. 13 is a flow diagram for the software routine used when the "user" key is depressed on the keyboard;

DETAILED DESCRIPTION OF THE INVENTION

The present invention provides a storage and monitoring system which may be physically constructed in the same manner disclosed in our copending application, Ser. No. 680,081, filed Dec. 10, 1984 and entitled "Method and Apparatus for Monitoring Keys and Other Articles", which application is herein incorporated by reference in its entirety. The article monitoring system of the present invention serves to monitor the locations of keys such as the keys for the automobiles in the inventory of an automobile dealership, and the system can also monitor other keys such as those that are handled by parking lots, rental car companies, real estate companies, factories, office buildings and other businesses which must keep track of a relatively large number of keys. It is also to be understood that the system can be used to monitor items other than keys, such as containers which hold pharmaceutical products.

Figure 1:
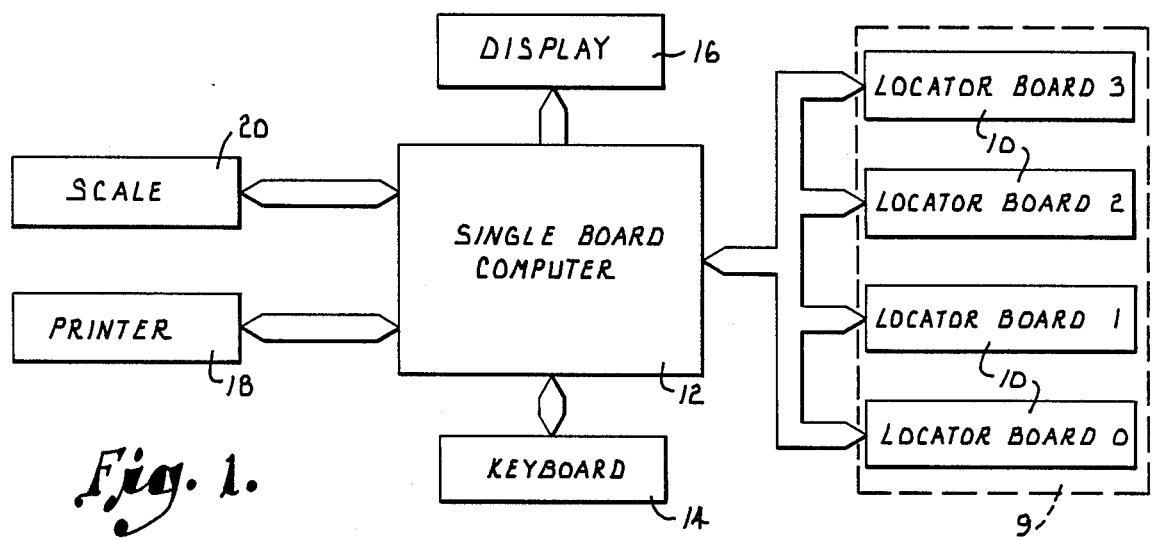
FIG. 1 is a functional block diagram of an article monitoring system constructed according to a preferred embodiment of the present invention.

As explained in the above referenced patent application, the keys or other articles which are monitored by the system are held by article holders which may be digitally coded cards that plug into edge connectors on a storage panel 9. The storage panel 9 may receive four different plug in type locator boards which are generally designated by numeral 10 in FIG. 1. By using the plug in locator boards 10, a "lot man" or other person can detach the boards 10 one at a time from the storage panel 9 in order to have ready access to all of the keys on the board, such as when storing automobiles overnight. It should be understood that a different number of locator boards can be provided if desired, and that provision of detachable locator boards is not a necessary part of the present invention.

In accordance with the present invention, the keys or other articles stored on the locator boards 10 are monitored through the use of a single board computer 12, a keyboard 14 and a digital display 16. A printer 18 and an optional weighing scale 20 are also included in the system and controlled by the computer 12. The computer functions to control all operations of the system, including the polling and servicing of the keyboard 14, the displaying of desired information on the display panel 16, scanning of the locator boards 10, storing in memory all transactions that occur on the locator boards 10, transmitting the required information to the printer 18, and transmitting information to and from the scale 20.

Figure 2:
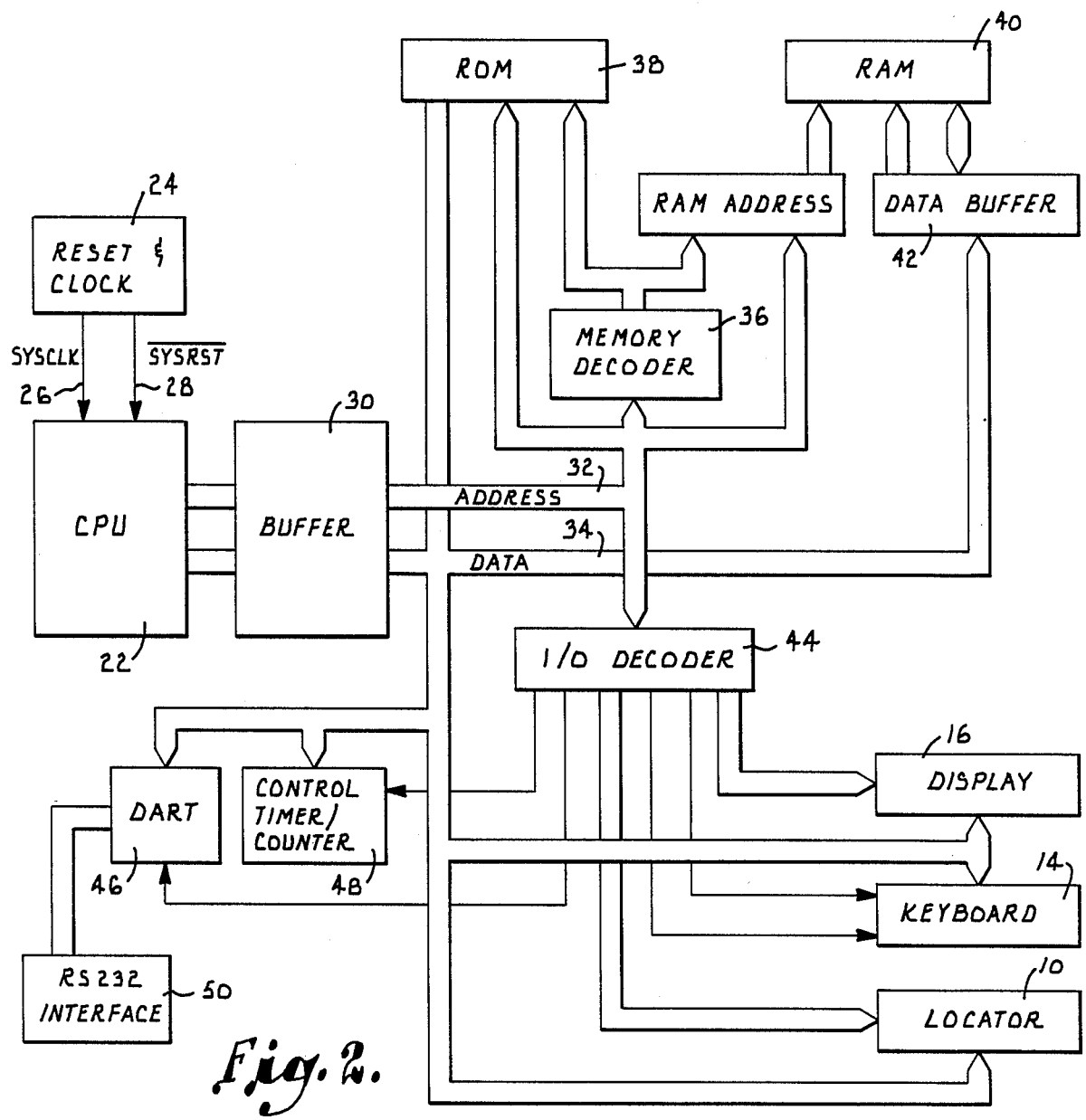
FIG. 2 is a block diagram of the single board computer included in the article monitoring system.

FIG. 2 illustrates in block diagram form the major elements of the single board computer 12. A Z80 central processing unit (CPU) 22 controls the operation of the system in accordance with the application software. A reset and clock circuit 24 provides synchronous operation via a system clock line 26 and provides both a power up reset and an internal push button reset (not shown) along a system reset line 28. A buffer 30 which includes four bus buffers provides buffering of the address and data signals which are applied on an address bus 32 and a data bus 34, respectively.

The address bus 32 connects with a memory decoder 36 which uses standard decoding methods to break the memory addressing into four 16K memory blocks. The first block of memory is used to address a read only memory (ROM) 38, and the remaining three blocks of memory are used to address a random access memory (RAM) 40. The data bus 34 connects with the RAM 40 through a data buffer 42. The memory consists of up to 16K ROM and 48K RAM. The ROM 38 preferably includes four 4K×8 EPROMS and uses standard addressing and reading techniques. The RAM 40 preferably includes twenty-four 16K×1 dynamic RAM'S (DRAMS) which are both cascaded and cascoded to create a 48K×8 memory block. Because dynamic memory is used in the RAM, special techniques are implemented for memory access, including memory refresh, address multiplexing and data buffering.

The address bus 32 connects with an in/out decoder 44 which uses standard decoding techniques to partially decode the in/out addressing into eight blocks of 32 addresses. The first block is used to address the display panel 16 which requires a further breakdown of the in/out addressing, as will be described more fully. The next four blocks of addresses are used to address the locator boards 10, while the sixth in/out addressing block is used to address the keyboard 14. The last two address blocks serve to address a dual asynchronous receiver/transmitter (DART) 46 and a control timer/counter (CTC) 48.

The on board DART 46 is used to provide an RS-232 interface 50 for the printer 18 and for the weighing scale 20 (if provided) and other computational devices that may be desired. The interface circuit which is connected to the RS-232 side of the DART 46 provides proper signal levels and also allows the single board computer 12 to appear as either data terminating equipment (DTE) or as data circuit terminating equipment (DCE).

Figure 5:
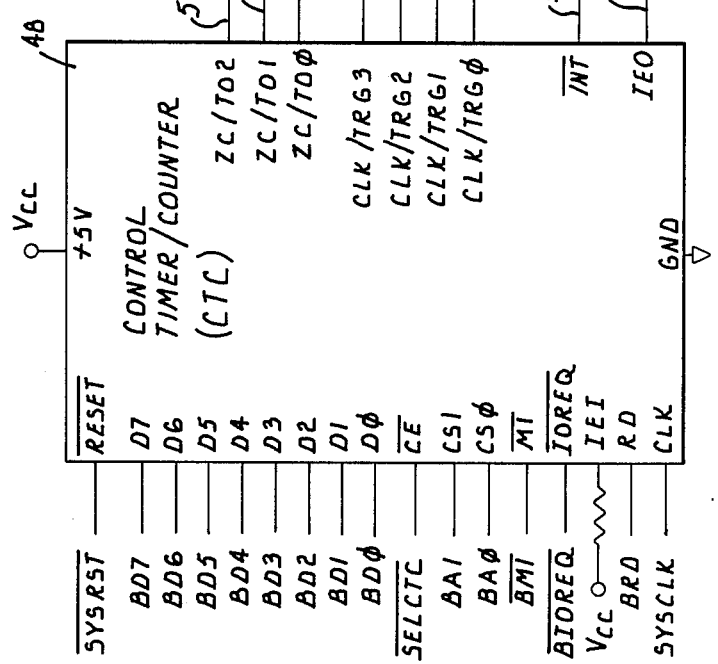
FIG. 5 is a schematic diagram of the control timer/counter included in the system.

As shown in FIG. 5, the CTC 48 receives buffered input signals from the CPU 22 and provides on its output side four timing channels for the single board computer 12. The highest priority channel is connected with output line 52 of the CTC and is used to maintain an internal time of day clock for the system. The second timing channel connects with the interrupt ($\overline{INT}$) line 54 and provides timing for program applications (including continual scanning of the locator boards 10). The final two channels are connected with the A clock and B clock lines 56 and 58 and serve to provide the baud rates for the two channels within the DART 46.

Figure 4:
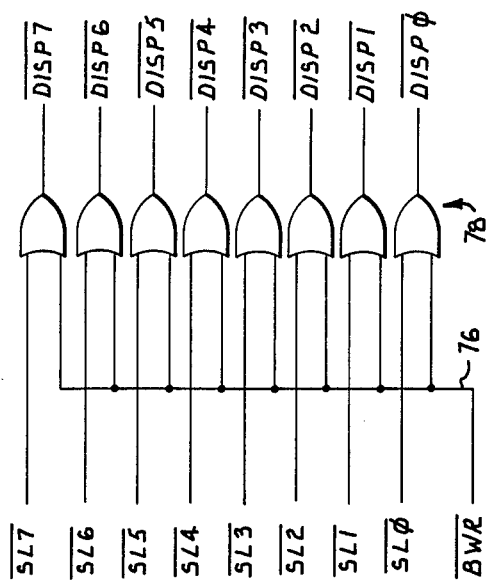
FIGS. 3 and 4 together form a schematic diagram of the in/out decoder included in the article monitoring system.
Figure 3:
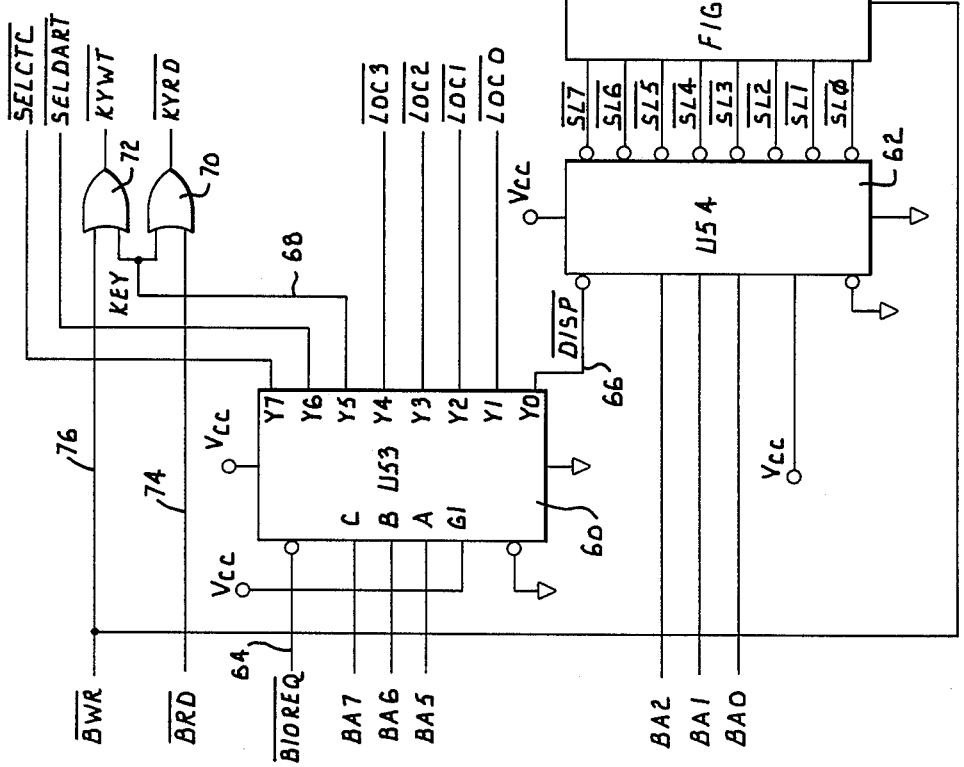

Referring now to FIGS. 3 and 4 together, the in/out decoder 44 includes a pair of data latches 60 and 62 which receive digitally coded signals on the buffered address lines BA5–BA7 and BA0–BA2, respectively. Circuit 60 is activated by a buffered in/out request ($\overline{BIOREQ}$) applied from the CPU on line 64. The Y0 output line 66 of circuit 60 provides a display signal ($\overline{DISP}$) which enables circuit 62. The Y1–Y4 output lines of circuit 60 are used to address the locator boards 10. The Y5 output line 68 is used to address the keyboard and forms one input to a pair of OR gates 70 and 72. The second input to gate 70 is a buffered read input ($\overline{BRD}$) on line 74, while the other input to gate 72 is a buffered write signal ($\overline{BWR}$) on line 6. The Y6 and Y7 outputs of circuit 60 are used to address the DART 46 and the CTC 48, respectively.

The output lines of data latch 62 are applied on the (SL0)–(SL7) lines which, as shown in FIG. 4, each connect with a different OR gate included in a gate array 78. The other input to each OR gate in the array 78 is provided on the buffered write line ($\overline{BWR}$) 76, while the output signals from the gates are provided on the display lines DISP 0–7.

Figure 6:
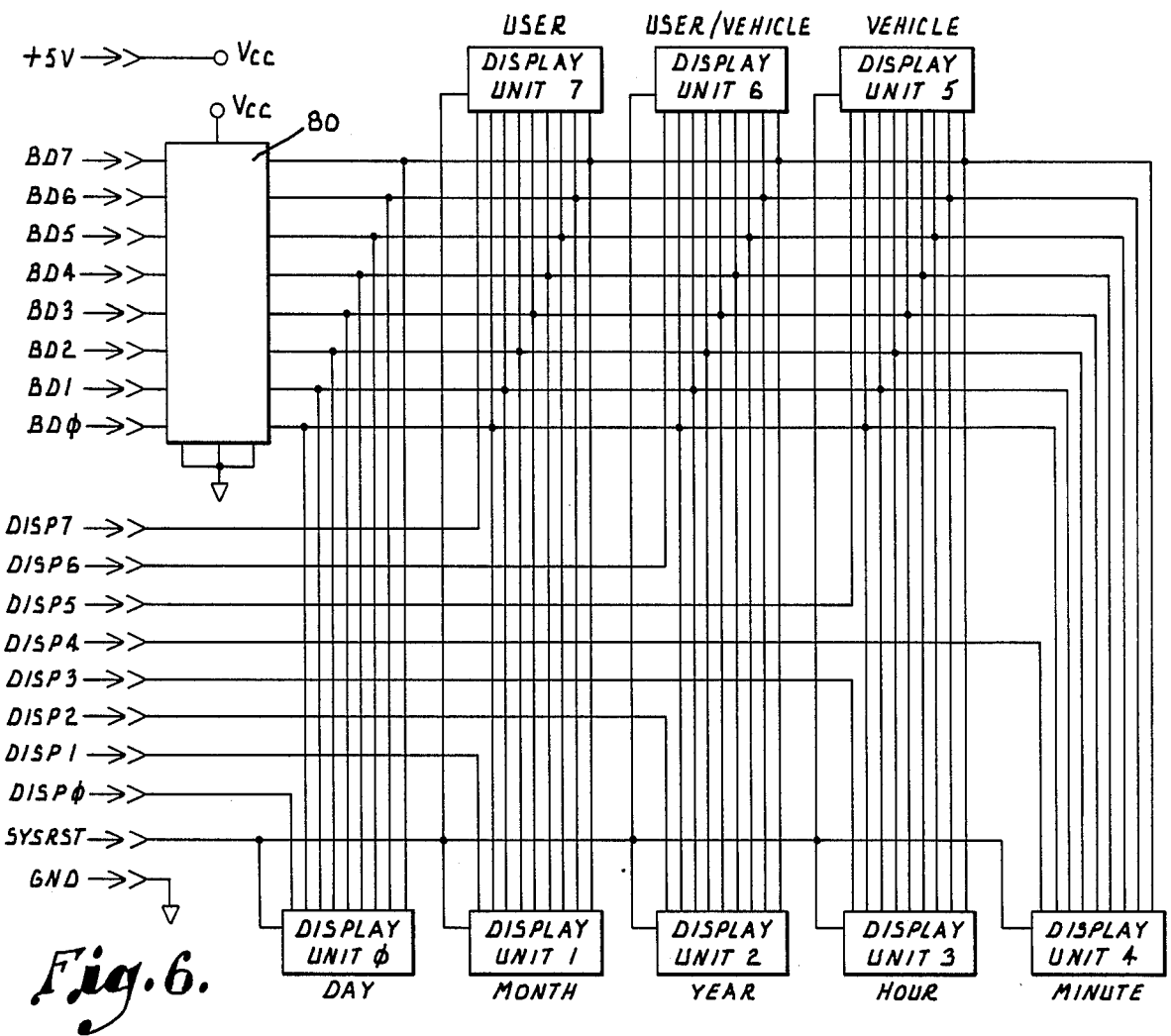
FIG. 6 is a schematic diagram of the circuitry which controls the display units in the system.

Referring now to FIG. 6, the display lines DISP 0–7 control display units 0–7, respectively, which are located on the display panel 16 on the face of the storage panel 9. Display units 0–4 respectively provide digital displays of the day, month, year, hour and minute. The remaining display units 5–7 provide digital displays of the vehicle, user/vehicle, and user, respectively. The data which is displayed on the display units is provided from circuit 80 which receives buffered data signals on its input side. Each of the display units 0–7 has a specific function, except that the "days" display unit 0 is used to perform two functions, namely, to display the current date when requested and to display the number of days that past transactions are to be printed by the printer 10. Standard techniques are used for the display. When the information is to be displayed, the approximate display unit is selected (via lines DISP 0–7), the data is latched, and the data written to the unit is displayed.

Figure 7:
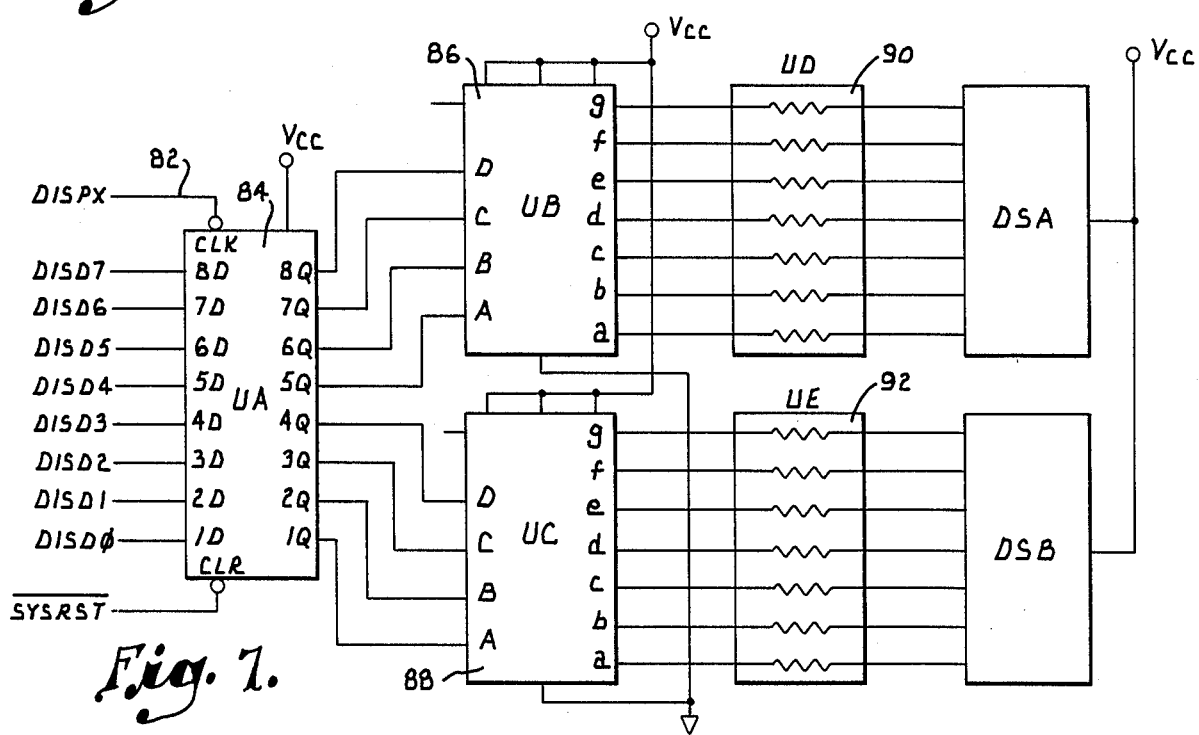
FIG. 7 is a schematic diagram of one of the display units in the system.

FIG. 7 illustrates schematically the circuitry for a typical one of the display units for the digital display 16. The enabling signal for the display unit is provided on line 82 as the clock input to a latch circuit 84. The outputs from circuit 84 are applied to a pair of decoder circuits 86 and 88 which in turn drive respective seven segment readout circuits 90 and 92. Any of the displays can have more than two digits if desired.

Figure 8:
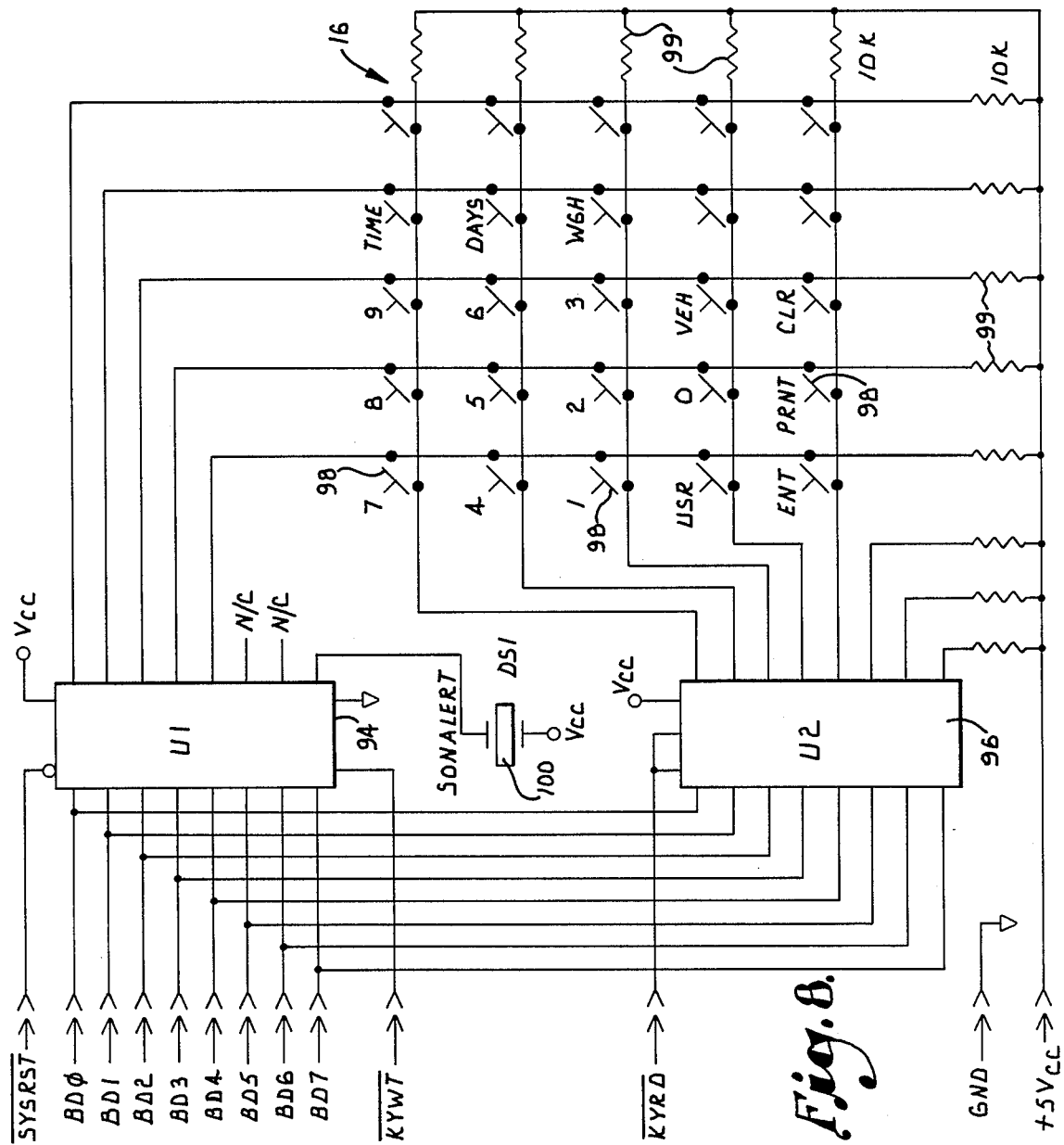
FIG. 8 is a schematic diagram of the circuitry for the keyboard included in the system.

The circuitry for the keyboard 14 is illustrated schematically in FIG. 8. A pair of latch circuits 94 and 96 receive buffered data from the central processing unit and are enabled by the key read ($\overline{KYRD}$) and key write ($\overline{KYWT}$) output signals from OR gates 70 and 72 (see FIG. 3). The output lines from circuit 94 provide vertical "columns" which include terminals for one side of each key 98 on the keyboard 16. The output lines from the other latch circuit 96 provide horizontal "rows" which include terminals for the other side of each key 98. The rows and columns are normally held in a high state through resistors 99, and if any row or column is in a low state, the corresponding row or column for a key which is depressed will likewise be placed in a low state due to the connection between the row and column provided by the depressed key.

This arrangement allows the computer to continually poll the keyboard 16 to determine when a key is depressed and to detect which key is depressed, as will be described more fully.

A crystal controlled audio alarm 100 is provided to indicate an incorrect procedure or illegal removal of an article from one of the locator boards. In the event of such an occurrence, the buffered data on line BO7 is set to a low state to provide a low signal on one side of the alarm 100. The other side of the alarm is connected with a positive voltage, so the alarm then sounds to provide an audible alarm signal.

Figure 9:
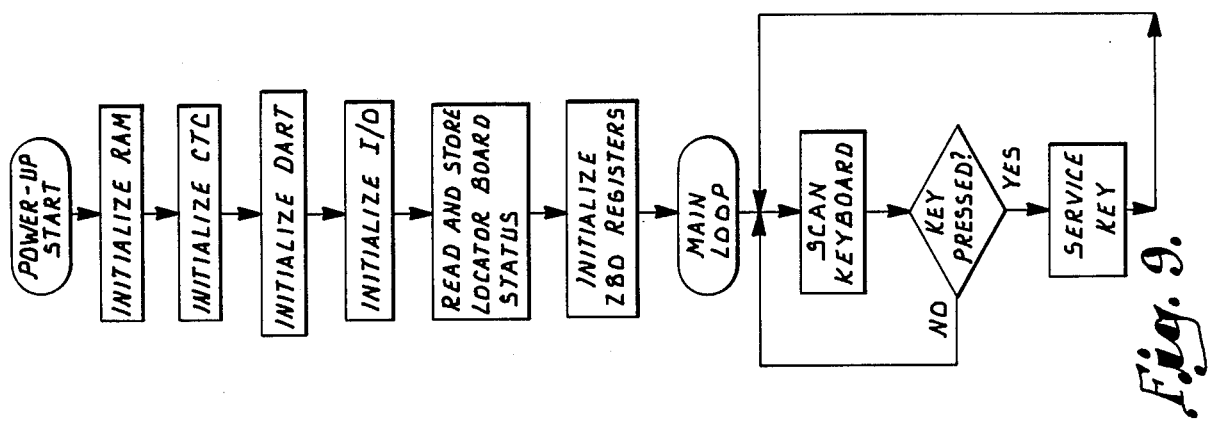
FIG. 9 is a flow diagram of the software which controls the operation of the system.

FIGS. 9–15 depict flow diagrams for the software used to control the CPU 22. Referring first to FIG. 9, upon powering up of the system, the RAM 40, CTC 48, DART 46 and in/out decoder 44 are initialized, along with the registers in the CPU. The storage locations (edge connectors) on the locator boards 10 are scanned for the presence of articles, and the identity of the articles at each storage location is determined and stored in memory. The main loop of the program involves scanning of the keyboard 16 and, if a key is depressed, the key is serviced in accordance with the routine shown in FIG. 12. Once the key has been serviced, or if there is no key depressed, the routine involves scanning of the keyboard again.

Referrig now to FIG. 10, the time of day is repeatedly updated by interrupt routine No. 1, and the program is returned to the main loop once the time of day has been updated.

FIG. 11 depicts the flow diagram for interrupt routine No. 2 which involves scanning of the locator boards 10. If there is no change in the locator boards status, (i.e., no article has been removed or returned) application timers are serviced and the program returns to the main loop. If there is a change in the locator board status, the change is serviced prior to servicing of the application timers and returned to the main loop.

If a key is depressed during scanning of the keyboard, the routine depicted in FIG. 12 is followed. First, the scan code is converted to a key code, and the particular key which is depressed is then determined, and the routine for that particular key is called. At the end of the key detect routine, the program returns to the main loop. Function mode 1 is entered if the "user" key is depressed, mode 2 is entered if the "vehicle" key is depressed, mode 3 is entered if the "days" key is depressed, and mode 4 is entered if the "set time" key is depressed.

Referring now to FIG. 13, the routine involved when the user key is depressed, includes fetching of the function register followed by a determination as to whether the function mode in effect is equal to 0. If it is, the function register is set to mode 1 and stored, the digit key in memory is cleared, and the user display is set to 0 preparatory to receiving entry of a user code before returning to the main loop. If the mode does not equal 0, the active function light is asserted, the audible alarm 100 is activated, the alarm timer is loaded for a short time out, and the active function error flag is set before returning to the main loop.

Figure 14:
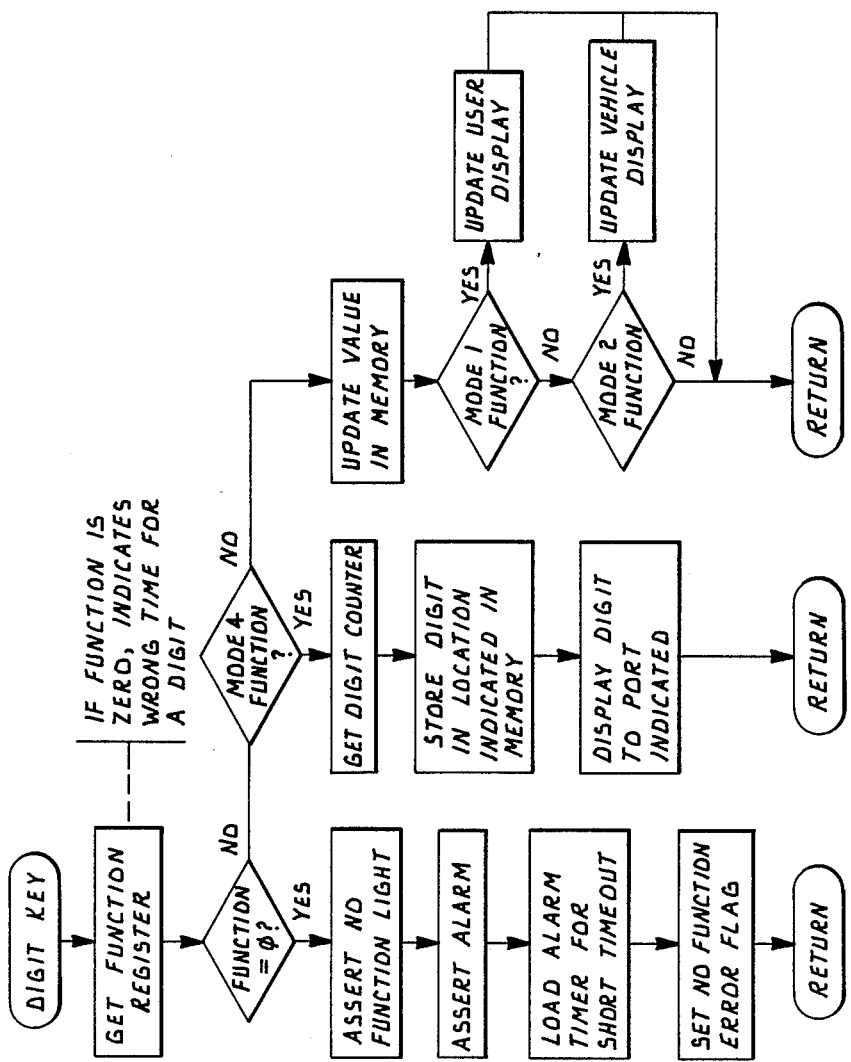
FIG. 14 is a flow diagram for the software routine used when one of the "digit" keys is depressed on the keyboard.

Referring now to FIG. 14, depression of the digit key on the keyboard 16 calls the digit key routine which first involves fetching of the function register and a determination of whether or not the function mode is equal to 0. If it is, the no function light is asserted, the alarm is activated, the alarm timer is loaded for a short time out and the no function error flag is set before returning to the main loop. If the function does not equal 0, a determination is made as to whether or not the mode 4 function (set time) is in effect. If it is, the digit counter is fetched, the digit is stored in the location indicated in the memory and it is displayed before returning to the main loop. If the mode four function is not in effect, the value in memory is updated and a determination is made as to whether or not the mode 1 function (user key) is in effect. If it is, the user display is updated prior to returning to the main loop. If it is not, a determination is made as to whether the mode 2 (vehicle key) is in effect. If it is, then the vehicle display is updated prior to returning to the main loop. If the mode 2 function is not in effect, the program immediately returns to the main loop.

Figure 15:
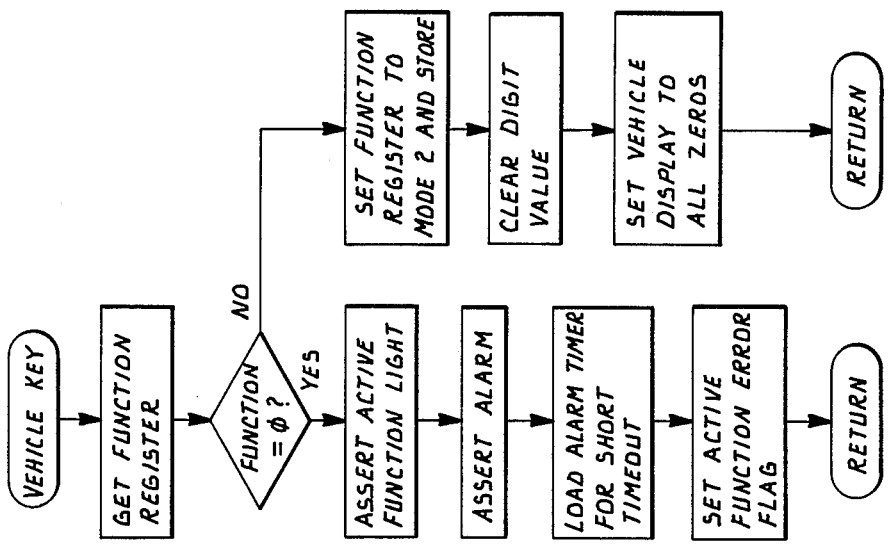
FIG. 15 is a flow diagram for the software routine used when the "vehicle" key is depressed on the keyboard.

With reference to FIG. 15, the routine which is followed when the vehicle key is depressed involves fetching the function register and determining whether or not the function is equal to 0. If it is not, the function register is set to mode 2 and stored, the digit value is cleared, and the vehicle display is set to all 0's (preparatory to receiving a coded vehicle number) prior to return to the main loop. If the function is equal to 0, the alarm routine is entered in the same manner previously described in connection with FIG. 13.

The system operates in substantially the same manner explained in the above referenced application Ser. No. 680,081. When the system is put into effect, the sales personnel and other authorized users of the system are each assigned a unique user code, and the code assigned to each authorized user is recorded. If the system serves the purpose of storing and monitoring keys, then each key is connected with a binary coded card of the type disclosed in the above referenced patent application, and each key holder is thus provided with a unique identification code determined by the binary code of its terminal strips. Each edge connector is assigned an address which the system associates with the key presently stored there, or with a vacancy if the edge connector is vacant.

Once the system has been activated, it begins continuous scanning of all of the edge connectors on the locator boards 10. The scanning provides the computer with continuously updated information as to which key is located at each addressable storage location on each locator board. During the scanning operation, the computer sequentially addresses the edge connectors in the locator boards and detects and stores in memory the identity of the key holding card which is inserted in the particular edge connector at each addressed location (or a vacancy if the edge connector is vacant).

The software also commands the polling or scanning of the keyboard 16 in order to detect the depression of the keys 98 on the keyboard. The scanning technique involves strobing low the "columns" (output lines of circuit 94) of the keyboard in sequence and reading the "rows" of the keyboard (output lines of circuit 96) each time one of the columns is strobed low. If all of the rows are in a high state when read, then none of the keys 98 is depressed and the scanning operation moves on to the next column. Once all of the columns have been strobed, the routine starts with the first column again and repeats the sequential strobing of the columns and reading of the rows.

If a particular key 98 is depressed, strobing of the column to a low state will result in the corresponding row being placed in a low state due to the connection between the column and row provided by the depressed key 98. Consequently during the reading operation, the row for the key will be read as being in a low state to inform the computer that the key has been depressed. The application software determines which key is depressed and performs the programmed service routine for that particular key.

If an incorrect procedure is followed or if a key is illegally removed from one of the locator boards, the BD7 input line of circuit 94 is placed in a low state, and the audible alarm 100 is then sounded.

When an authorized user of the system desires to locate and remove a particular key, he first depresses the clear (CLR) key 98 and then enters his personal user code which may be a three digit number by depressing the appropriately numbered keys in succession. The user code will be displayed on the "user" display unit (display unit 7 in FIG. 6). The user then presses the enter (ENT) key, and the display will go blank if the user code is valid. If the user code is invalid, the alarm 100 will sound and the user display (unit 7) will display all 8's. The user code can be reentered by waiting for the display and alarm to terminate and repeat the procedure starting with depression of the user key and entry of a valid user code.

Once a valid user code has been entered and accepted, the vehicle key (VEH) is then depressed, followed by entry of the numerical identification code which corresponds to the vehicle which is desired (a description of which is contained on the storage panel in connection with its identificatoon code). The enter key ENT is then depressed, and if the key for the desired vehicle is present on one of the locator boards 10, the indicator light directly above the key will be energized to provide an indication of the location of the key on the storage panel. The user can then remove the key from the locator board, and the system retains in memory the user code, the identification code of the removal key, and the date and time of its removal. If the key is not present on any of the locator boards, the identification code number for the key will be displayed on the "vehicle" display unit (display unit 5 in FIG. 6). The date and time of its removal and the user code which was in effect at the time the key was removed will be displayed on the "user/vehicle" display unit (display unit 6). This information provides the identity of the person in possession of the key and allows it to be obtained from him. If the missing key was illegally removed from the storage panel, the user display will display all 8's.

An authorized user can remove more than one key at a time from the board after his valid user code has been entered and accepted. The authorized user can enter multiple identification codes in succession and remove the keys which correspond to the identification codes which are entered, and this procedure can be repeated as many times as desired so long as each identification code is entered within sixty seconds following entry of the previous code. After each identification code is entered, the key which is indicated by the corresponding indicator light can either be immediately removed or it can remain on the board with its indicator light remaining in the energized state while subsequent identification codes are entered. At the end of the entry of all of the desired identification codes, the various indicator lights will remain energized, and all of the desired keys can then be removed at the end of the procedure. Each identification code must be entered within sixty seconds of the previous entry, or all of the prior entries will be erased.

A "hard" printed copy of transactions can be ordered by depression of the print (PRNT) key 98. In one printing mode, a record of all of the keys that have been removed by a particular authorized user (for up to thirty days) can be printed by depressing the user key following depression of the print key and then entering the user code for the user whose activity is being monitored. The enter key is then depressed, and the alarm will sound if the user code is invalid. If the user code is valid, the display goes blank, and the "days" key is then depressed followed by entry of the number of days to be covered (there is a maximum of thirty days is the preferred embodiment, although this limitation on the permissible "backtracking" can be changed). When the enter key is subsequently depressed, the printer 18 begin, to print a record which contains information providing the identification code of each key removed by the person who is being monitored, along with a record of the date and time each key was removed and returned. When the printing operation has been completed, the printer 18 becomes inactive and the normal operation of the system is resumed automatically.

In another mode of operation of the printer, a record can be printed indicating which authorized users removed a particular key during the time that is covered. To enter this mode of operation, the vehicle key is depressed following depression of the print key. The identification code for the desired vehicle is then entered on the digit keys, and the enter key is depressed. If the identification code is invalid, the alarm will sound. If it is valid, the display will be cleared. The days key is then depressed, followed by depression of the proper digit keys for the number of days to be covered followed by depression of the enter key. The printer then prints a written record which contains information as to the user code of each user who removed the key for the desired vehicle from the storage panel, alone with the date and time the key was removed and returned by each user.

The printed records which are available by reason of the provision of the printer 18 provide management of the automobile dealership with information which is of considerable assistance in personnel evaluation and inventory selection. For example, each salesman can be monitored as to his activity in demonstrating vehicles, and it can also be determined whether a particular salesman or other person is making use of vehicles for lunches or personal errands. It can also be determined which vehicle models are being regularly demonstrated to customers and which are seldom if ever being demonstrated. This provides the management of the dealership with information concerning which models and/or colors are popular with prospective customers, and this information is valuable with respect to inventory planning.

Although the invention has been described with respect to the storage and monitoring of keys for the inventory of an automobile dealership, it should be understood that keys for other types of businesses can also be monitored. For example, real estate offices, factories, office buildings and rental car companies have need to monitor a large number of keys, and the system is useful in these types of businesses as well as others.

It should also be understood that the system can be used to monitor articles other than keys. For example, pharmaceutical containers can be monitored in pharmacies and other businesses which handle pharmaceutical and similar products. In the case of pharmaceuticals, the optional weighing scale 20 is preferably provided, and each container for the pharmaceuticals is preferably weighed immediately after it is removed and again immediately before it is returned to its storage location. The container can be placed on the scale 20, and the weigh (WGH) key 98 can then be depressed to weigh the container and its contents and provide information as to the weight to the computer 12. After a prescription has been filled, the container is again placed on the scale 20 and weighed, and the computer then has information concerning the weight of the pharmaceutical that was dispensed and the identity of the authorized user at the time (and the date and time the pharmaceutical was dispensed). This information is helpful in keeping track of the inventory of the pharmacy and in other businesses. It is contemplated that the scale will identify the objects in the same manner as the storage panel. If an object is not weighed on the scale within a preselected time after its removal from the storage board, or within a preselected time before it is returned to the storage panel, a secondary alarm will signal the lack of a weighing operation.

It is noteworthy that each key or other article which is removed from the storage panel 9 need not be replaced at the particular storage location from which it was removed. Each article can be returned to any vacant storage location on the storage panel, and the computer 12, through the scanning of the locator boards, is able to determine that the article is now present on the board in a different storage location. This ability of the storage panel to receive the articles randomly rather than at preassigned locations is an important feature of the invention which enhances its appeal.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. Apparatus for storing and monitoring articles and maintaining a record of the articles, said apparatus comprising:
   a plurality of article holders each holding one article and each having a unique identification code which identifies the article held thereby;
   a storage member having a plurality of discrete storage locations for the articles, each storage location having a unique address and each storage location being adapted to receive and store the article holders one at a time;
   means for accepting and recording valid user codes assigned to authorized users;

means for polling said storage locations to determine and update the identification code of the article holder at each location an indicator on said storage member for each storage location, each indicator having an energized condition and a deenergized condition;

means for accepting coded requests corresponding to the identification codes of the article holders when the coded requests are accompanied by a valid user code;

means for energizing the indicator which corresponds to the storage location of each article holder whose identification code corresponds to an accepted coded request, thereby indicating the storage location of the article holder to which each coded request corresponds if the article holder is present on the storage member;

means for recording the user code accepted at the time each article holder is removed from the storage member;

means for displaying the user code accepted at the time an article holder was removed from the storage member if the article holder is not present on the storage member thereby identifying the user responsible for removing the article holder from the storage member;

printing means selectively operable to print a written record of the user codes accepted at the time one or more selected articles were removed from the storage member; and means for weighing and recording the weight of each article holder before its removal from the storage member and prior to its return to the storage member, thereby recording the weight of material removed from the article holder while it was removed from the storage member.

2. Apparatus as set forth in claim 1, including means for recording the date and time each article holder is removed from the storage member and the date and time each article holder is returned to the storage member.

3. Apparatus as set forth in claim 2, wherein:

said printing means has a first mode of operation wherein is printed the identification codes associated with all article holders removed at the time a selected user code was accepted, and the date and time each such article holder was removed from the storage member and returned thereto; and said printing means has a second mode of operation wherein is printed all user codes accepted at the time an article holder corresponding to a selected identification code is removed, and each date and time the article holder was removed from the storage member and returned thereto.

4. a method of storing and monitoring articles which are accessible to authorized users and maintaining a record of which users access the articles, said method comprising the steps of:

providing a storage panel having a plurality of discrete storage locations at which the articles may be stored;

storing the articles at the storage locations;

assigning to each article a unique identification code;

polling the storage locations periodically to determine the identification code of the article at each location;

assigning to each authorized user a valid user code;

accepting valid user codes and rejecting invalid user codes;

accepting coded requests which correspond to the identification codes only if the request is accompanied by a valid user code;

indicating the location of an article which corresponds to an accepted coded request;

recording the user code accepted at the time each article is removed from the panel;

determining the date and time each article is removed from the panel and returned thereto;

selectively printing a written record of the user codes accepted at the time one or more articles were removed from the panel, said record also containing the date and time each such articles was removed form the panel and returned thereto;

weighing each article after removal of same from the panel;

weighing each article before return of same to the panel to determine the weight of material removed while the article was absent from the panel; and printing a written record of the weight of each article at the time of its removal from the panel and at the time of its return thereto.

* * * * *